United States Patent Office 3,129,190
Patented Apr. 14, 1964

3,129,190
PRODUCTION OF ANHYDROUS FRIEDEL-CRAFTS
CATALYST
Marion E. Hill, Palo Alto, Calif., assignor to the United States of America as represented by the Secretary of the Navy
No Drawing. Filed Mar. 31, 1961, Ser. No. 99,969
6 Claims. (Cl. 252—442)
(Granted under Title 35, U.S. Code (1952), sec. 266)

The invention described herein may be manufactured and used by or for the Government of the United States of America for governmental purposes without the payment of any royalties thereon or therefor.

The invention relates generally to the novel method of drying metal halide catalysts and is more particularly concerned with a process for the production of anhydrous catalysts of the Friedel-Crafts type.

Metal halides are useful as catalysts for alcoholation, acylation and a variety of condensations proceeding through an intermediate carbonium ion. It has been found to be absolutely essential that these catalysts be completely anhydrous, any water present in such reactions can poison the catalytic activity of the halides.

Prior to this invention several methods were employed to render such catalysts anhydrous and to return "spent" or water containing catalysts to their reactive state by the removal of water. One method of drying ferric chloride, for example, is to heat it in a stream of chlorine and to sublime pure anhydrous ferric chloride and to condense the sublimed chloride. This method requires special equipment for the heating and drying of the carrier gas and for trapping out unused gases. Furthermore, the iron chloride may be converted to the oxide, an undesirable by-product of this process. Prior to this invention, aluminum chloride could only be dried by sublimation and anhydrous aluminum chloride was therefore very expensive.

It is an object of this invention to provide a novel method of drying catalysts of the Friedel-Crafts type.

Another object of the invention is to produce dry iron gallium and aluminum chloride by the use of the hydrolytic action of water on carbon tetrachloride in the presence of these catalysts.

These and other objects will become more readily apparent when the following specification is read and understood.

Still another object is to provide a method for the dehydration of metal chloride catalysts without the attendant formation of the metal oxide.

It has been found that catalysts such as $FeCl_3$, $GaCl_3$, and $AlCl_3$ can be returned to their useful anhydrous state by refluxing carbon tetrachloride (B.P.=76.8° C.) until the reaction of the water of hydration of the chlorides with the carbon tetrachloride is complete. The reaction between the carbon tetrachloride and the water produces phosgene gas according to Equation I.

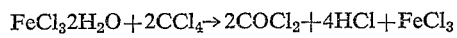

$$FeCl_3 2H_2O + 2CCl_4 \rightarrow 2COCl_2 + 4HCl + FeCl_3$$

The phosgene and the HCl produced by this reaction may be swept out by dry air or nitrogen. Isolation of the dried catalyst in virtually pure condition may be accomplished by decanting the carbon tetrachloride and removing the residual carbon tetrachloride under reduced pressure. The temperature of the reaction need not necessarily be kept at the boiling point of carbon tetrachloride. Reaction has been observed at temperatures as low as 50° C. and the temperature may be maintained above 77° C. providing suitable pressure equipment is used.

The principle of this invention may be used to dry catalysts which are dried by their own catalytic action upon the hydrolysis of carbon tetrachloride. For example, $AlCl_3$ containing some water of hydration can be dried by the $FeCl_3 \cdot H_2O$—$CCl_4$ reaction by mixing anhydrous $FeCl_3$ with hydrated $AlCl_3$ and adding to $CCl_4$. After a suitable period of refluxing followed by an inert gas sweep, an active mixed catalyst is isolated.

The following illustrative examples are given in order to show typical modes of practicing this invention and are not to be construed as limiting this invention in any manner.

Example I

A mixture of 162 grams of commercial "anhydrous" ferric chloride and 500 ml. of carbon tetrachloride are heated at the reflux temperature of carbon tetrachloride (76.8° C.) for twenty-four hours. The phosgene and hydrogen chloride gases produced by the hydrolysis of the carbon tetrachloride were swept out by dry air into a solution of potassium hydroxide and methanol. After completion of the reaction period, the reaction mixture was cooled, the carbon tetrachloride decanted, and the ferric chloride was removed as a black particulate solid. Residual solvent was removed under reduced pressure and the dry active ferric chloride was obtained.

Example II

A mixture of 234 grams of ferric chloride hydrated with four moles of water was placed in 1,000 ml. of carbon tetrachloride and refluxed for twenty-four hours. The gas efflux was treated as in Example I, at the end of this twenty-four hour period the ferric chloride was isolated as a dry material according to the method of Example I.

Example III

A mixture of 4.5 grams of anhydrous ferric chloride, and 133 grams of aluminum chloride containing approximately 10 grams of water was placed in 1,000 ml. of carbon tetrachloride, which was then heated at reflux temperature (76.8° C.) for twenty-four hours. The phosgene gas was removed by sweeping the reacting solution with dry air and scrubbing the efflux gases to remove hydrogen chloride and phosgene. The mixed catalyst was isolated according to the method described in Example I.

Example IV

A solution of 10 grams of gallium chloride in 150 ml. of carbon tetrachloride was refluxed until there was no chloride or phosgene in the efflux. A gallium chloride oil was recovered by distillation at reduced pressure and further distilled to produce a dry anhydrous crystalline gallium chloride.

Obviously, the invention is susceptible of many modifications and alterations within its intended scope and is to be construed as not limited by the foregoing illustrative examples but only by the scope of the appended claims.

What is claimed as new and desired to be secured by Letters Patent of the United States is:

1. The process for producing an anhydrous Friedel-Crafts catalyst selected from the group consisting of $FeCl_3$, $AlCl_3$, and $GaCl_3$ and mixtures thereof which comprises adding the said catalyst, containing water of hydration, to carbon tetrachloride, refluxing the resulting admixture at a temperature of about 76.8° C., until the evolution of phosgene and hydrogen chloride ceases, sweeping the reaction mixture with dry air, cooling the reaction mixture and decanting the carbon tetrachloride and recovering the anhydrous catalyst, free from $CCl_4$.

2. The process of claim 1 wherein the Friedel-Crafts catalyst is an admixture of $FeCl_3$ and $AlCl_3$.

3. The process of claim 1 wherein the catalyst is $GaCl_3$.

4. The process of claim 1 wherein the catalyst is $FeCl_3$.

5. The process of claim 1 wherein the ratio of the volume of carbon tetrachloride to catalyst is about 7-15:1.

6. The process for producing a dry mixed catalyst of $AlCl_3$ and $FeCl_3$ which comprises adding a mixture of substantially an anhydrous $FeCl_3$ and hydrated $AlCl_3$ to carbon tetrachloride, refluxing the resulting admixture at a temperature of about 76.8° C. until the evolution of phosgene and hydrogen chloride ceases, sweeping the reaction mixture with dry air, cooling the reaction mixture and decanting the carbon tetrachloride and recovering the anhydrous catalyst, free from $CCl_4$.

References Cited in the file of this patent

UNITED STATES PATENTS 2,394,412     Veltman _____ Feb. 5, 1946